(12) United States Patent
Panda et al.

(10) Patent No.: US 12,353,832 B1
(45) Date of Patent: Jul. 8, 2025

(54) GENERIC CONTEXTUAL NAMED ENTITY RECOGNITION

(71) Applicant: ExlService Holdings, Inc., New York, NY (US)

(72) Inventors: Swagat Panda, Angul (IN); Sujit Kumar Sahoo, Lawrenceville, NJ (US); Sanjay Pathak, Greater Noida (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 19/015,466

(22) Filed: Jan. 9, 2025

(51) Int. Cl.
  *G06F 17/00* (2019.01)
  *G06F 40/295* (2020.01)
  *G06F 40/30* (2020.01)

(52) U.S. Cl.
  CPC ............ *G06F 40/295* (2020.01); *G06F 40/30* (2020.01)

(58) Field of Classification Search
  None
  See application file for complete search history.

(56) References Cited

U.S. PATENT DOCUMENTS

| | | | | |
|---|---|---|---|---|
| 11,676,410 B1 * | 6/2023 | Sandu | .................. | G06V 30/416 382/156 |
| 11,941,365 B2 * | 3/2024 | Higashinaka | .......... | G06N 20/00 |
| 12,001,465 B2 * | 6/2024 | Higashinaka | ....... | G06F 16/3344 |
| 2023/0106298 A1 * | 4/2023 | Mostafa | .................. | H04N 7/155 348/14.08 |
| 2023/0134796 A1 * | 5/2023 | Bhatnagar | .............. | G06N 20/20 704/9 |
| 2024/0289863 A1 * | 8/2024 | Smith Lewis | ......... | G06N 3/008 |
| 2025/0005072 A1 * | 1/2025 | Salowitz | ............. | G06F 16/9035 |
| 2025/0005459 A1 * | 1/2025 | Yao | ........................ | G06N 20/00 |

* cited by examiner

*Primary Examiner* — Satwant K Singh
(74) *Attorney, Agent, or Firm* — Perkins Coie LLP

(57) ABSTRACT

Improved systems and methods for named entity recognition (NER) are disclosed and can include attaching domain-specific context to extracted data. In a particular example implementation, the techniques can include an artificial intelligence (AI) based entity extraction and labeling process using unstructured data as input. The generated labels can include automatically determined entity types. The techniques can further include a domain-aware entity resolution process. First, applying a reverse question-and-answer (Q&A) technique to the output of the entity extraction and labeling process can generate a set of predicted entity keys (e.g., predicted metadata identifiers, such as likely database column references) for the extracted entities and entity types. Second, entity alignment operations can enable determining domain-specific entity keys for the predicted entity keys. In some implementations, the techniques can be utilized to identify named entities in an electronic conversation, such as a chat session.

20 Claims, 9 Drawing Sheets

GENERIC CONTEXTUAL NAMED ENTITY RECOGNITION

BACKGROUND

Natural Language Processing (NLP) is a subfield of artificial intelligence (AI) that aims to facilitate interaction between computers and humans in natural language. NLP combines computer science, linguistics, and machine learning to enable computers to process, understand, and generate human language. By leveraging NLP, computers can extract insights from text data, facilitate more natural human-computer interactions, and generate coherent text. NLP can be useful in various human/computer interactive fields, including virtual assistants, language translation applications, and customer service chatbots.

Conventional NLP systems struggle with out-of-vocabulary words, domain-specific terminology, and linguistic and cultural differences, resulting in biased or inaccurate results. Furthermore, the requirement for large amounts of high-quality training data and the need for significant computational resources also pose significant technical challenges for NLP development. To overcome these challenges, Named Entity Recognition (NER) techniques can be used. NER involves identifying and categorizing named entities in unstructured text into predefined categories. NER algorithms enable computers to automatically extract and classify named entities, facilitating applications such as information retrieval, question answering, and text summarization. For instance, in the sentence "Company XYZ is looking at buying U.K. startup for $1 billion," an NER system could identify "Company XYZ" as an organization, "U.K." as a location, and "$1 billion" as a monetary value.

Conventional NER systems face several technical challenges that impede their performance and accuracy. One issue is the difficulty in handling out-of-vocabulary entities, which are names that do not appear in the training data. This can lead to the need for prohibitively large training data sets to accommodate many vocabulary entities or, conversely, poor recognition rates for new or emerging entities. Another challenge is the problem of ambiguity, where a single name can refer to multiple entities (e.g., "Bank" can refer to a financial institution or the side of a river). Additionally, conventional NER systems can struggle with entity disambiguation (e.g., distinguishing between multiple individuals with the same name) and handling of context-dependent entities (e.g., recognizing "Washington" as a state or a person as appropriate). These challenges highlight the need for more robust NER techniques.

BRIEF DESCRIPTION OF THE DRAWINGS

Detailed descriptions of implementations of the present invention will be described and explained through the use of the accompanying drawings.

Figure 1:
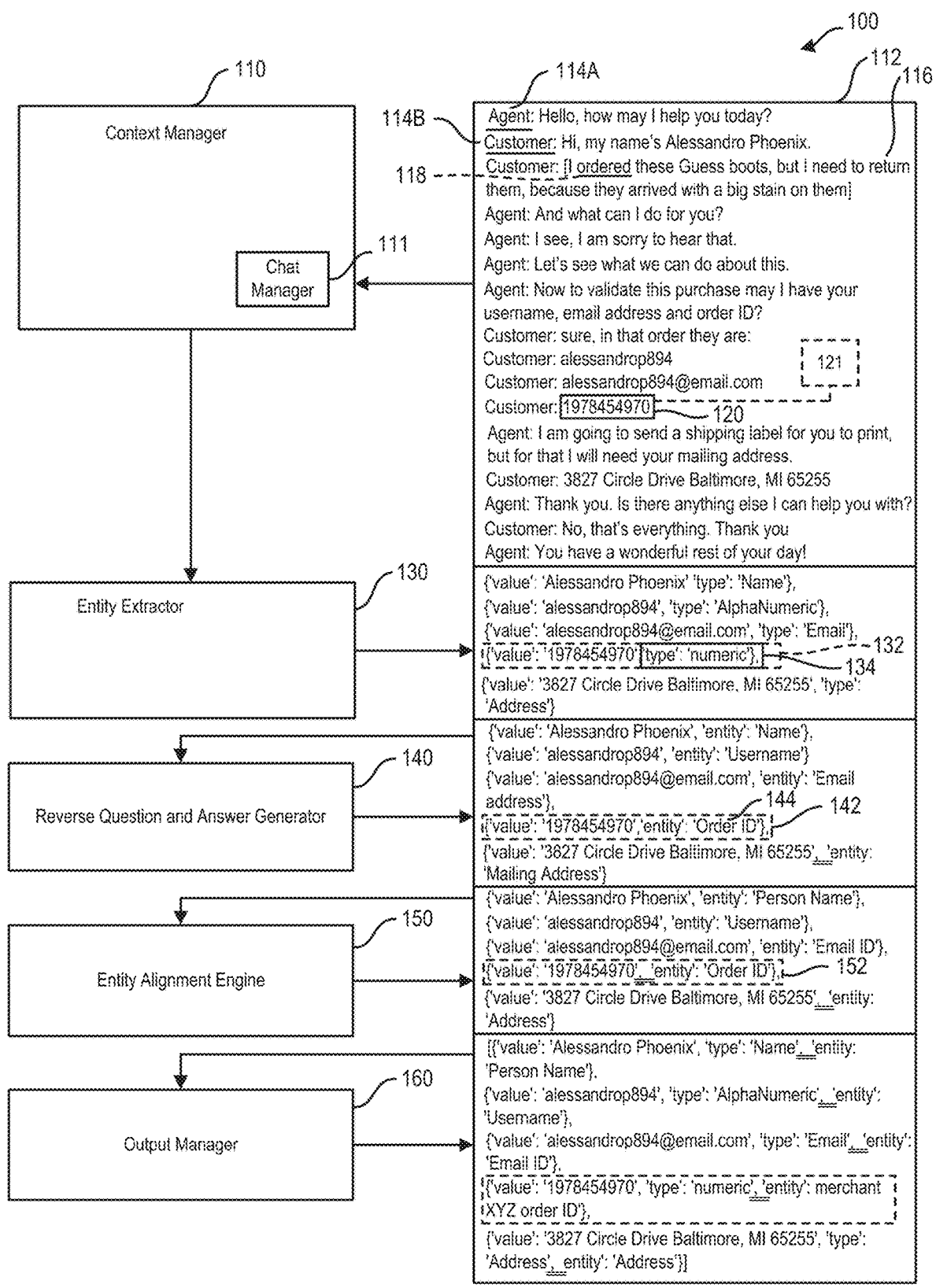
FIG. 1 shows an example generic contextual NER platform in accordance with some implementations of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Conventionally, solutions available for NER are non-customizable and extract a predetermined set of entities. For example, conventional NER techniques can involve training AI models to extract specific entities, and out-of-vocabulary entities can be missed by such systems unless AI models are thoroughly trained. To remedy this problem, it is possible to train conventional AI models using large training data sets that include many variants of data points. However, generating large training data sets for such systems can be time-consuming because of the need for human verification of training data. Further, generating large training data sets by, for example, generating synthetic data or by running queries against operational data stores can consume processor and other compute resources (e.g., network bandwidth needed to transmit query results). Additionally, conventional AI models for NER can be difficult to deploy and/or customize because they have to be trained for specific implementations. Furthermore, training AI models on large data sets can result in model overfitting to training data. That is, training on large datasets can lead to over-optimization, where the model can become too specialized to the training data, which can reduce reliability and accuracy of model output.

This disclosure describes techniques for intelligently extracting entities from a body of unstructured data (textual data, alphanumeric data, and/or numerical data). In addition to extracting the entities, the generic contextual NER platform described herein can implement techniques for automatically determining attributes of the extracted entities. The determined attributes can be utilized by the platform to interpret entity-related information in domain-specific context. To that end, described herein are techniques for attaching domain-specific context to extracted data. In a particular example implementation, the techniques described herein can include an AI-based entity extraction and labeling process. The generated labels can include automatically determined entity types. The process can further include a two-step entity resolution process. First, applying a reverse question-and-answer (Q&A) technique, prompt-response technique, or another suitable technique to the output of the entity extraction and labeling process can generate predicted entity keys (e.g., predicted metadata identifiers, such as likely database column references) for the extracted entities and entity types. Second, entity alignment operations enable matching the predicted entity keys to domain-specific entity keys.

In some implementations, domain-specific entity keys can be determined using semantic matching techniques (e.g., according to a data dictionary, ontology, domain-specific data set or the like) and/or according to a set of deterministic rules. For example, deterministic rules can include a set of if-then statements. As another example, deterministic algorithms can be implemented by fuzzy matchers. Examples of such deterministic algorithms include Levenshtein distance to measure the minimum number of single-character edits (insertions, deletions, or substitutions) needed to change one string into another, Jaro-Winkler distance to measure the similarity between two strings based on the number of common characters and their order, and Longest Common Subsequence (LCS) to find the longest contiguous substring common to two particular strings. In some implementations, domain-specific entity keys can be determined by non-deterministic (probabilistic or heuristic) models, such as Bayesian networks, Markov models, and/or trained neural networks. In some implementations, domain-specific entity keys can be determined using non-deterministic semantic matchers. For example, machine learning-based matchers can use machine learning algorithms, such as neural networks or decision trees, to learn the patterns and relationships between entities. As another example, probabilistic ontologies can be used to represent the uncertainty and ambiguity of semantic relationships between entities. As another example, graph-based algorithms, such as graph neural networks or graph convolutional networks, can be used to learn patterns and relationships between entities in a graph structure.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Generic Contextual Named Entity Recognition (NER) Platform

FIG. 1 shows an example generic contextual NER platform 100 in accordance with some implementations of the present technology. As shown, the generic contextual NER platform 100 can include a context manager 110, chat manager 111, entity extractor 130, reverse question-and-answer generator 140, entity alignment engine 150, and/or output manager 160. According to various implementations, these components can be omitted and/or combined and can be implemented in a singular system or in a distributed fashion.

The generic contextual NER platform 100 can facilitate intelligent recognition of entities in units of unstructured data. For example, unstructured data can include a chat session 112. The chat session 112 can be a communication session between an agent (e.g., a call center agent, a customer service agent, a virtual assistant, a customer support chat bot) and an individual (e.g., a customer, a user, etc.). Accordingly, the generic contextual NER platform 100 can be accessible to one or more users. The users can be individual persons or entities directly or indirectly interacting with the generic contextual NER platform 100 via a communication apparatus (e.g., telecommunications device, a digital user interface, and/or the like) coupled to one or more components of the platform. For example, a customer can submit, via the chat session 112, a service support request (e.g., an erroneous feature report, maintenance instructions, and/or the like) to be resolved by an agent. In other examples, the platform can facilitate intelligent recognition of entities in documents, conversation transcripts, and other previously generated items that can include units of unstructured data.

The context manager 110 is configured to access or receive the units of unstructured data 116. For example, the chat manager 111 of the context manager 110 can invoke the chat session 112 to manage conversations between a particular agent 114a (or set of agents) and a particular customer 114b (or set of customers). A particular conversation can include a set of units of unstructured data 116, which can include sentences, words, tokens, paragraphs, tabular data, system-generated items, and/or the like. The context manager 110 is configured to parse or generate a particular unit of unstructured data 116 or a set of units (116, 121) using at least a portion of the conversation. In some implementations, the context manager 110 can apply deterministic rules (e.g., if-then rules), keyword searches, and/or trained neural networks to parse out sets of related units of unstructured data (116, 121) from a conversation. For example, a first unit of unstructured data 116 can include a keyword (e.g., the word "ordered" in a customer statement "I ordered these . . . boots, but I need to return them") and a second unit of unstructured data 121 can include an order identifier provided by the customer. In some implementations, the context manager 110 can reference a data store, such as a look-up table, a database, or the like, to determine a set of candidate items for the second unit of unstructured data 121. For example, a customer can be identified using a customer identifier parsed from the chat session 112 (e.g., a login id, a customer-provided identifier) and a set of orders for the particular customer can be generated and presented to the customer via the chat session 112. The customer can select an order (second unit of unstructured data 121) therefrom.

The entity extractor 130 can process the units of unstructured data (116, 121) to generate a set of entities using one or more units of unstructured data. The generated set of entities can include structured or semi-structured data suitable for processing by downstream AI models. For example, the generated set of entities can include entries in XML files, HTML files, key-value pairs, tables, in-memory data structures (e.g., Python lists, dictionaries, tuples, arrays, data frames, graphs), TCP packets, HTTP packets, and so forth. As shown, a particular entity 132 can include one or more value fields and one or more metadata fields 134. The value fields can be populated by the entity extractor 130 using data parsed or generated by the context manager 110. The metadata fields 134 can be populated by the entity extractor 130 by applying one or more AI models trained to automatically determine a type (e.g., data type, entity type) corresponding to the value field. The AI models can include any suitable model for performing NER operations, including Recurrent Neural Networks (RNNs), Convolutional Neural Networks (CNNs), Transformers, Conditional Random Fields (CRFs), Support Vector Machines (SVMs), and/or Gradient Boosting Machines (GBMs). Some example models for NER include BERT, Stanford CoreNLP, spaCy, and NLTK. The output of the entity extractor 130 (e.g., a set of one or more of a particular entity 132) can be saved in a memory accessible to the entity extractor 130 to incrementally train the AI model(s) of the entity extractor 130.

Furthermore, the output of the entity extractor 130 (e.g., a set of one or more of a particular entity 132) can be provided to a reverse question-and-answer generator 140. The reverse question-and-answer generator 140 can be configured to generate a modified predicted entity set, which can include predicted entity keys 144. The predicted entity keys 144 can be thought of as metadata identifiers, such as likely database column references automatically generated for the extracted entities 132 using the entity types and/or the values parsed or determined based on the conversation in the chat manager 111. For example, given a value "1978454970" of type "numeric", the reverse question-and-answer generator 140 can generate a candidate set of predicted entity keys using an AI model designed to answer questions based on a given text or context. The candidate set of predicted entity keys can include a candidate entity type, such as "order id". The AI model can be a model capable of receiving a question text and predicting an answer to a question based on the input text. In some implementations, the reverse question-and-answer generator 140 can generate the question text using the particular entity 132. For example, given a value "1978454970" of type "numeric", the reverse question-and-answer generator 140 can generate a question "What is value '1978454970' of type 'numeric'?" and cause the AI model to generate a predicted answer, "order id".

To facilitate deployment of the generic contextual NER platform 100, the AI models of the entity extractor 130 and/or reverse question-and-answer generator 140 can be pre-trained using globally applicable corpuses of training data. To adapt the platform to various use cases in specific domains, entity alignment operations can further include matching the predicted entity keys 142 to domain-specific entity keys (152, 162). To that end, the entity alignment engine 150 can execute computer-based operations (e.g., using fuzzy logic, semantic matching, lookup tables, ontologies, data dictionaries, or combinations thereof) to generate domain-specific entity keys (152, 162). In some implementations, a first particular domain-specific entity key 152 can be set to assume the value of a particular predicted entity key 142 (for example, by determining that the predicted entity key 142 is within a similarity threshold to a domain-specific entity key 152, or by using the predicted entity key 142 as a default when no domain-specific entity key 152 is found in a particular dictionary or ontology). In some implementations, a second particular domain-specific entity key 162 can override the value of a particular predicted entity key 142, such as when the platform finds a domain-specific meaning that is significantly different from conventional meaning.

The output manager 160 can deduplicate and consolidate the outputs of the upstream components of the generic contextual NER platform 100. For example, the output manager 160 can generate a set of items 162, which can include the values parsed or generated by the context manager 110, the types generated by the entity extractor 130, and/or the domain-specific entity keys generated by the entity alignment engine 160. In some implementations, the output manager 160 can reference additional ontologies to further contextualize items in the set of items 162. For example, in a use case where a particular customer support platform manages operations for multiple merchants, the output manager 160 can cross-reference a data store to determine supplemental information ("merchant") that can be relationally linked to the domain-specific entity ("order").

The generic contextual NER platform 100 can be implemented using components of the example computer system 600 illustrated and described in more detail with reference to FIG. 6. Likewise, implementations of an example generic contextual NER platform 100 can include different and/or additional components, which can be connected in different ways. For example, the computing servers 410 of FIG. 4 can be configured to perform one or more operations described herein. In additional examples, the computing databases 415 of FIG. 4 can be configured to perform one or more operations described herein.

In some examples, various circuits (modules) of the systems described here can include integrated circuits (e.g., application specific integrated circuits (ASIC)) that can include a set of neurons and a set of synaptic circuits that link the neurons in a neural network. The neurons can include, for example, memory units (e.g., registers), processors units (e.g., microprocessors) and/or input gates. The synaptic circuits can include memory units that store synaptic weights. According to various implementations, any of the context manager 110, chat manager 111, entity extractor 130, reverse question-and-answer generator 140, entity alignment engine 150, and/or output manager 160 can be implemented as ASICs, individually or in combination. In one example, the technical problem of avoiding large training datasets and AI model overfitting can be solved by training the AI models of the entity extractor 130 and/or reverse question-and-answer generator 140 using globally applicable training data sets and implementing these components as one or more ASICs. Reliability of the overall pipeline, however, can be maximized by individually training the models of the entity alignment engine 150 and/or output manager 160 using domain-specific data, subscriber entity data, use case data, and so forth.

Figure 2A:
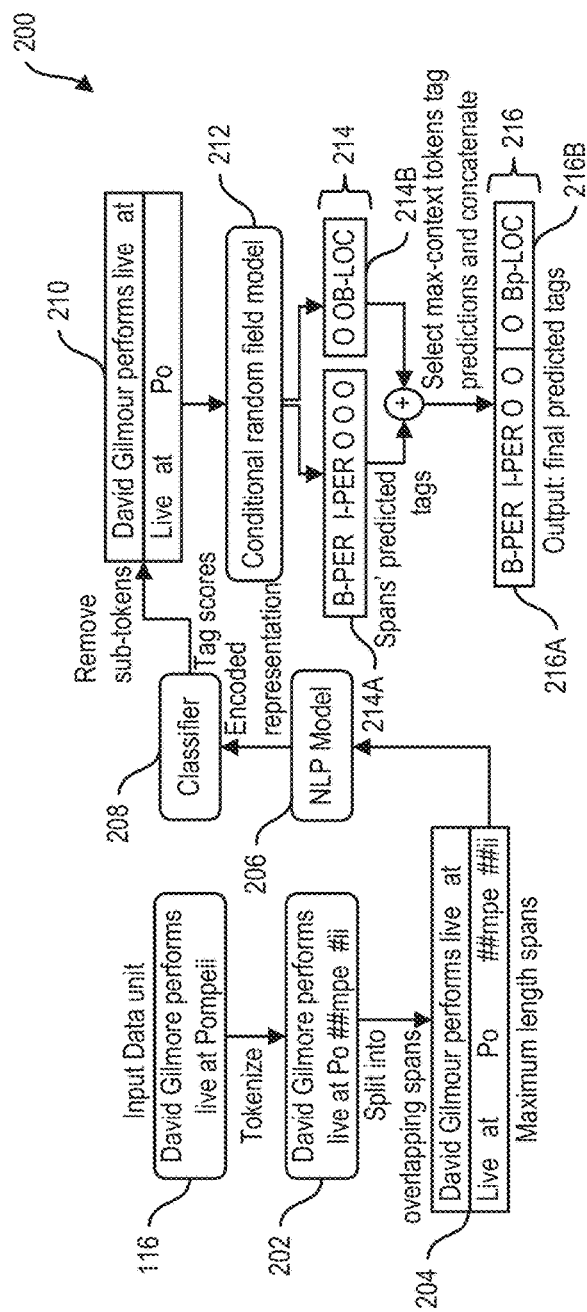
FIGS. 2A and 2B illustrate aspects of operation of an example entity extractor component of the generic contextual NER platform, in accordance with some implementations of the present technology.
Figure 2B:
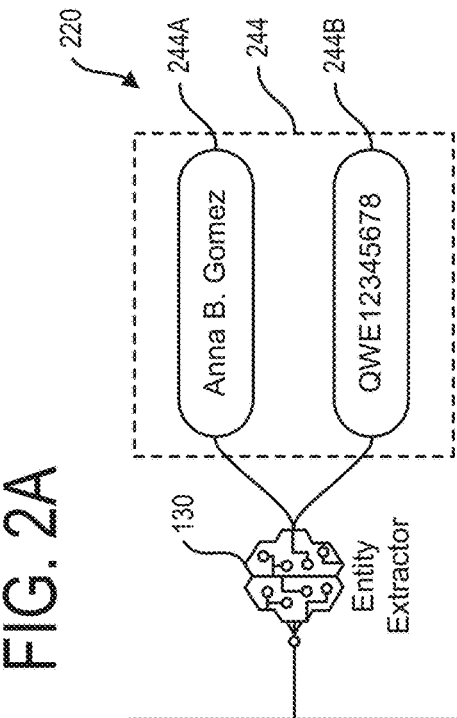
Figure 2B:
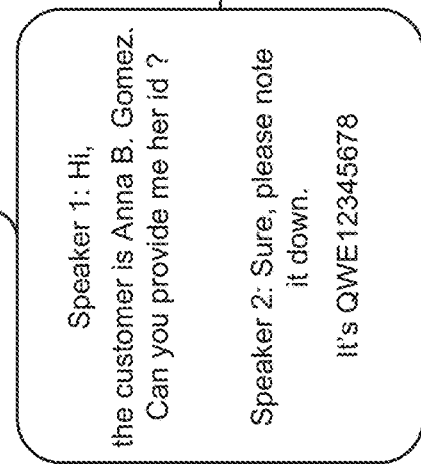

FIGS. 2A and 2B illustrate aspects of operation of the entity extractor 130 of the generic contextual NER platform 100, in accordance with some implementations of the present technology. As shown, the entity extractor 130 can include an NLP model 206. The NLP model 206 can be trained to generate encoded representations of contextualized embeddings that reflect semantic structures of the underlying units of unstructured data 116. For example, a particular unit of unstructured data 116 can be tokenized to generate a token set 202. The token set 202 can be split into overlapping spans 204, which can be provided as an input to the NLP model 206. The NLP model 206 can be a suitable model capable of generating contextualized, vectorized data using unstructured input data. A non-limiting example of an NLP model 206 is BERT.

The NLP model 206 can generate an encoded (vectorized) representation of the overlapping spans 204. The encoded representations can be tagged with classifiers 208 (e.g., "B" denoting beginning of an entity, "I" denoting inside of an entity, "O" denoting outside of an entity). The entity extractor 130 can generate a conditional random field (CRF) input unit 210 where subtokens are removed from the overlapping spans 204 tagged with classifiers. The CRF input unit 210 can be provided to a CRF model 212 or another suitable sequential labeler model, which can apply sequential labeling techniques generate a set of predicted tags for each encoded span in the set of classified overlapping spans 204. As shown, set 214a includes a first predicted span 214a (performer) and set 214b includes a second predicted span 214b (location). The classified overlapping spans 204 can be concatenated to generate predicted tags.

In some cases, the predicted tags can denote predicted entities. For example, an input conversation segment 222 can be used to generate a set of entities 224 that can include a particular first entity 224a and a particular second entity 224b. In some cases, the predicted tags can denote entity types, predicted data types or other predicted metadata fields 134 that can be sufficient, alone or in combination, to generate a predicted entity key 142. For example, first entity 224a can have a type "text" and second entity 224b can have a type "numeric".

Figure 2C:
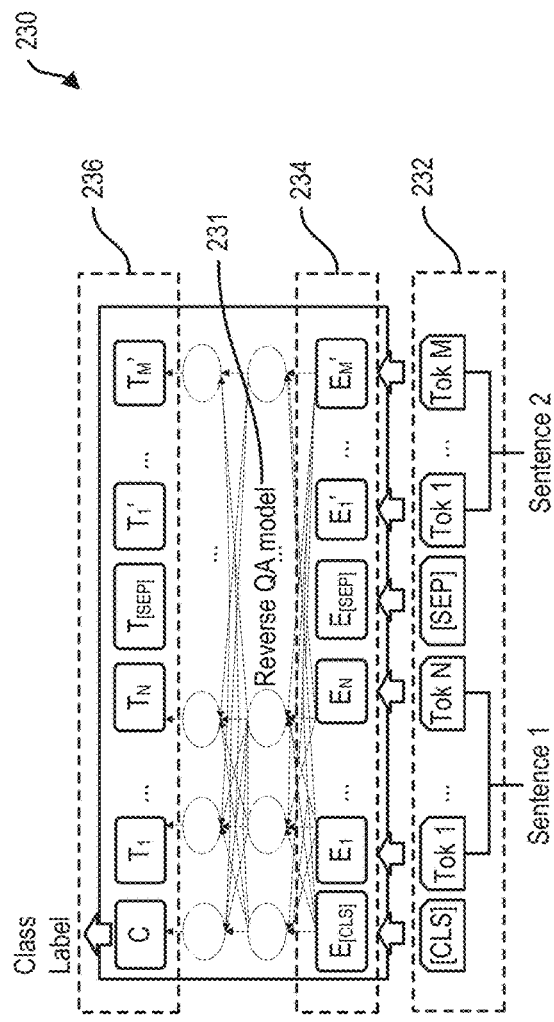
FIGS. 2C and 2D illustrate aspects of operation of an example reverse question-and-answer generator component of the generic contextual NER platform, in accordance with some implementations of the present technology.
Figure 2D:
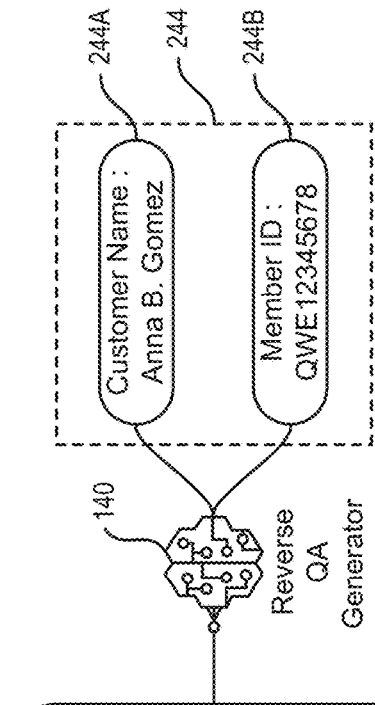

FIGS. 2C and 2D illustrate aspects of operation of the reverse question-and-answer generator 140 of the generic contextual NER platform 100, in accordance with some implementations of the present technology. The reverse question-and-answer generator 140 can extract keys present in input text 242 for each entity extracted from previous step. In some cases, the input text 242 is one or more of the units of unstructured data 116. In some cases, the input text 242 is the set of entities 224 generated by the entity extractor 130. As shown, the reverse question-and-answer generator 140 can generate or receive a set of tokenized sentences 232, transform the tokenized sentences 232 into a set of vectorized items 234, and apply a reverse question-and-answer model 231 (e.g., ROBERTA) to the set of vectorized items 234 to generate a set of class labels 236.

The set of class labels 236 can be a set of predicted entity keys 142, which can denote predicted entities or entity types. For example, the reverse question-and-answer generator 140 can generate a set of predicted entities 244, which can include a first predicted entity 244a and a second predicted entity 244b, each having a value and a predicted entity key. By utilizing reverse question-and-answer techniques (e.g., "What is Anna B. Gomez?"), the platform facilitates the ability to ask specific and contextually appropriate questions about various entities present in the input data without prior knowledge of all the specific entities. Accordingly, the reverse question-and-answer model 231 can be trained (e.g., using a set of reverse question-and-answer data points) or can use unsupervised learning techniques to learn about tokens present in the input data without having prior knowledge of input data domains or domain-specific attributes.

Figure 2E:
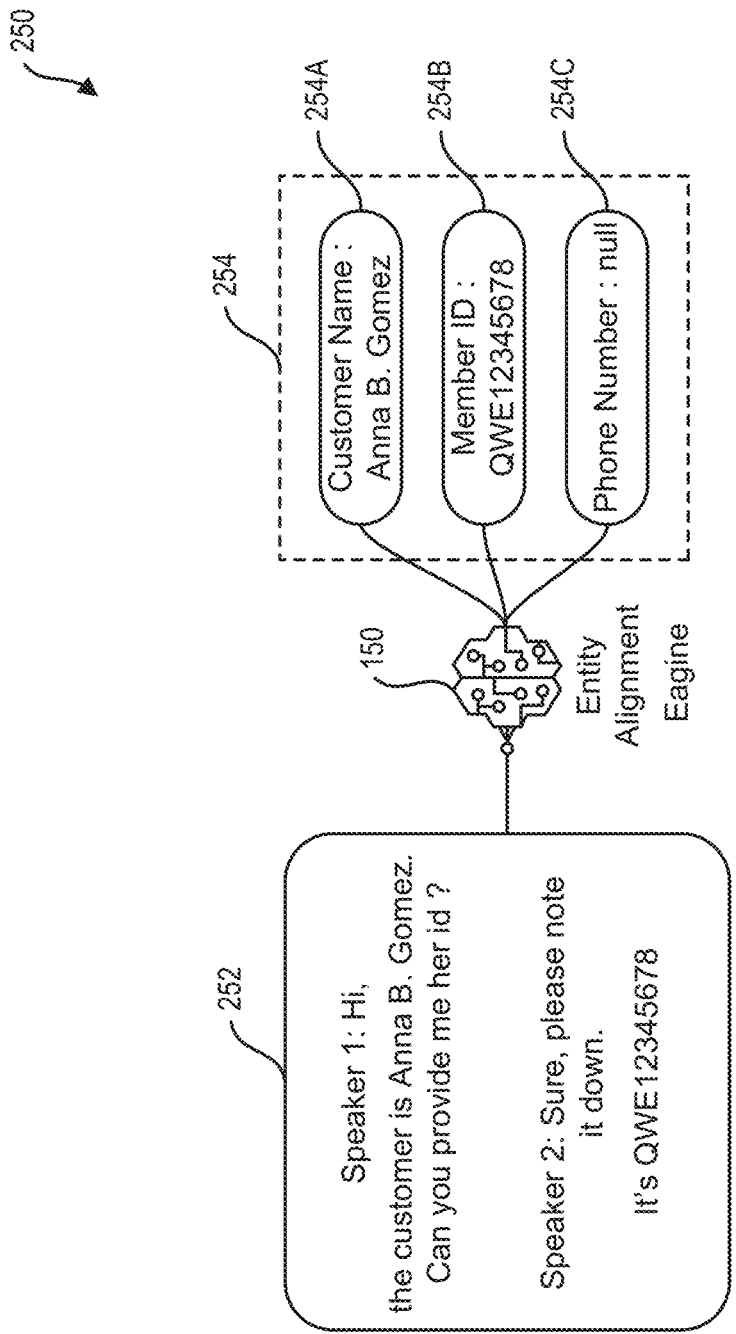
FIG. 2E illustrates aspects of operation of an example entity alignment engine of the generic contextual NER platform, in accordance with some implementations of the present technology.

FIG. 2E illustrates aspects of operation of the entity alignment engine 150 of the generic contextual NER platform 100, in accordance with some implementations of the present technology. The entity alignment engine 150 can determine or generate domain-specific entity keys by using fuzzy matching techniques that involve linking the keys extracted with fields in an ontology (alignment dictionary), by assessing their similarity using a suitable technique, such as Levenshtein distance, Jaro-Winkler distance, or LCS. For instance, "Customer Name" and "Name" may represent the same entity despite differences in word order and abbreviation. In an example use case, the alignment dictionary of the fields used to generate the domain-specific entity keys 254 can be as follows: "{Customer Name: [name, customer, member, person], Member Id: [Id, identification, serial], Phone Number: [phone, contact, number, contact number]}".

Similarity values can be compared to similarity thresholds to determine if two particular strings are similar. For Levenshtein distance, an example similarity threshold is 0.6-0.8, which means that two strings are considered similar if their Levenshtein distance is less than or equal to 0.6-0.8 times the length of the longer string. The Levenshtein distance ratio and Levenshtein similarity can be used to calculate the similarity between two strings. For example, consider the strings "kitten" and "sitting". The Levenshtein distance between these two strings is 3. The Levenshtein distance ratio is 3/7=0.43, and the Levenshtein similarity is 1−(3/7)≈0.57. These metrics indicate that the two strings are somewhat similar, but not identical. Jaro-Winkler distance is another measure of similarity between two strings. An example similarity threshold for Jaro-Winkler distance can be 0.9-0.95, which means that two strings are considered similar if their Jaro-Winkler distance is greater than or equal to 0.9-0.95. For example, consider the strings "martha" and "marhta". The Jaro-Winkler distance between these two strings is 0.961, indicating that they are very similar. The Jaro-Winkler similarity is also 0.961, confirming that the two strings are almost identical. An example similarity threshold for LCS can be 0.5-0.7, which means that two strings are considered similar if their LCS is greater than or equal to 0.5-0.7 times the length of the shorter string. For example, consider the strings "abcdef" and "zbcdfg". The LCS between these two strings is "bcd". The LCS ratio is 3/6≈0.5, and the LCS similarity is 1−(1−(3/6))≈0.5. These metrics indicate that the two strings share some common characters, but are not highly similar.

Similarity thresholds can be set, as part of configuration information, and stored in a memory accessible to the generic contextual NER platform 100. In various implementations, similarity thresholds can be domain- or subscriber-specific and can be stored associatively with a particular domain or subscriber ontology.

Example Methods of Operation of the Generic Contextual NER Platform

Figure 3A:
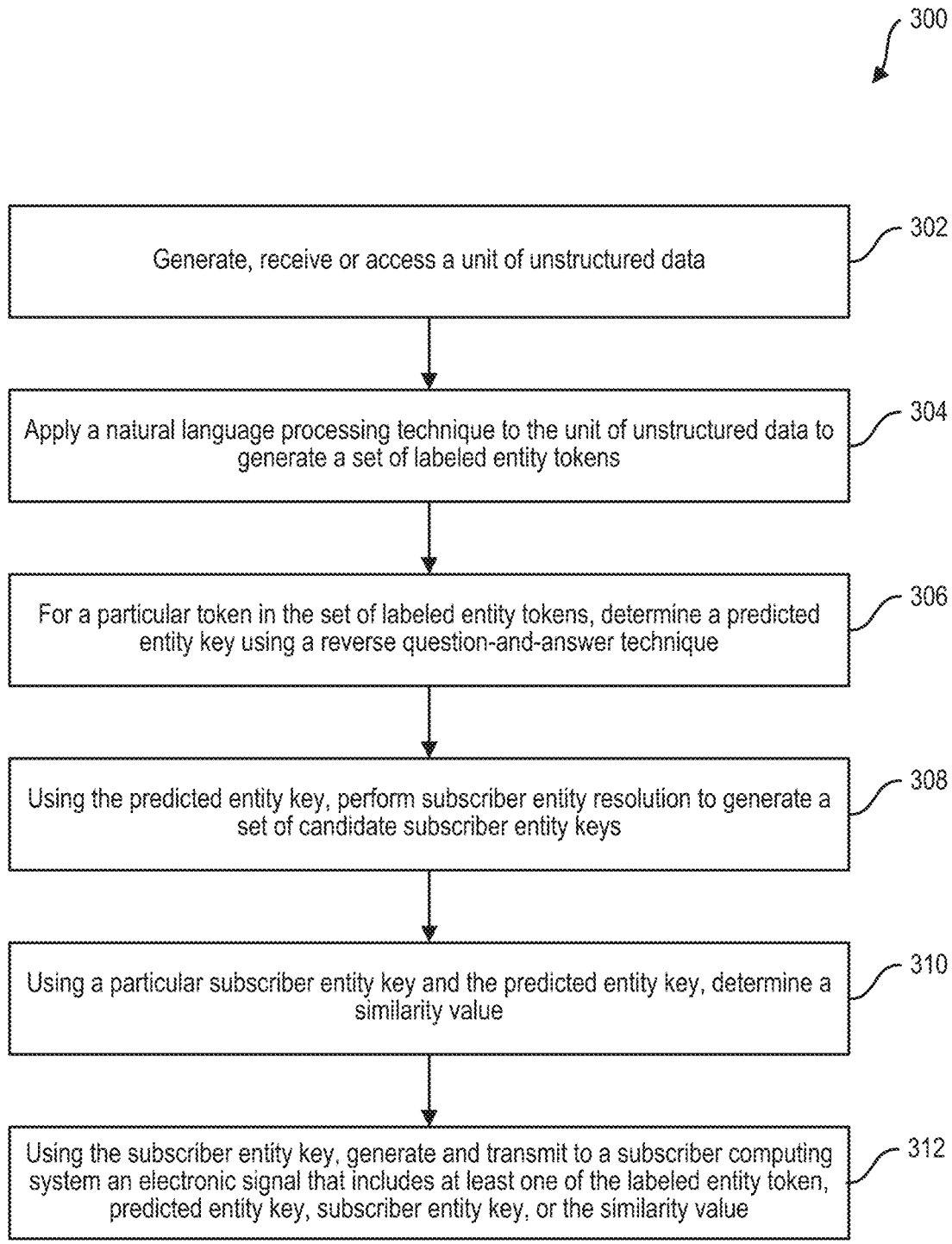
FIG. 3A is a flow diagram that illustrates an example method for generic contextual NER using entity alignment, in accordance with some implementations of the present technology.

FIG. 3A is a flow diagram that illustrates an example process 300 for performing generic contextual NER using entity alignment, in accordance with some implementations of the present technology. The process 300 can be performed by a system (e.g., generic contextual NER platform 100) configured to perform the operations described herein. In one example, the system includes at least one hardware processor and at least one non-transitory memory storing instructions, which, when executed by the at least one hardware processor, cause the system to perform the process 300. In another example, the system includes a non-transitory, computer-readable storage medium comprising instructions recorded thereon, which, when executed by at least one data processor, cause the system to perform the process 300.

At 302, the platform can generate, receive or access a unit of unstructured data. For example, the data can be included in a text file, conversation transcript, or another document, or can be intercepted from a real-time electronic conversation, such as a chat bot conversation in an active (unexpired, open, and so forth) chat session at a subscriber computing system. At 304, the platform can apply an NLP technique (e.g., BERT-CRF) to the unit of unstructured data or a part thereof to generate a set of labeled entity tokens. For example, a particular labeled entity token can include a value and an automatically determined data type. At 306, a particular labeled entity token can be provided to a reverse question-and-answer model (e.g., ROBERTA) to generate a predicted entity key. The predicted entity key can correspond to a metadata item, database column, a key in a set of key-value pairs, a tag in a markup language structure, an in-memory reference, an IP address, or another address of an addressable data element. At 308, the platform can generate a set of candidate subscriber keys (domain-specific keys) that match, partially match, or are predicted to have a classifier that corresponds to the predicted entity key. At 310, the level of similarity between the predicted entity key and a particular candidate subscriber key can be assessed, and, at 312, an electronic signal can be generated for transmission to the subscriber computing system and can include an item associated with the aforementioned operations.

Figure 3B:
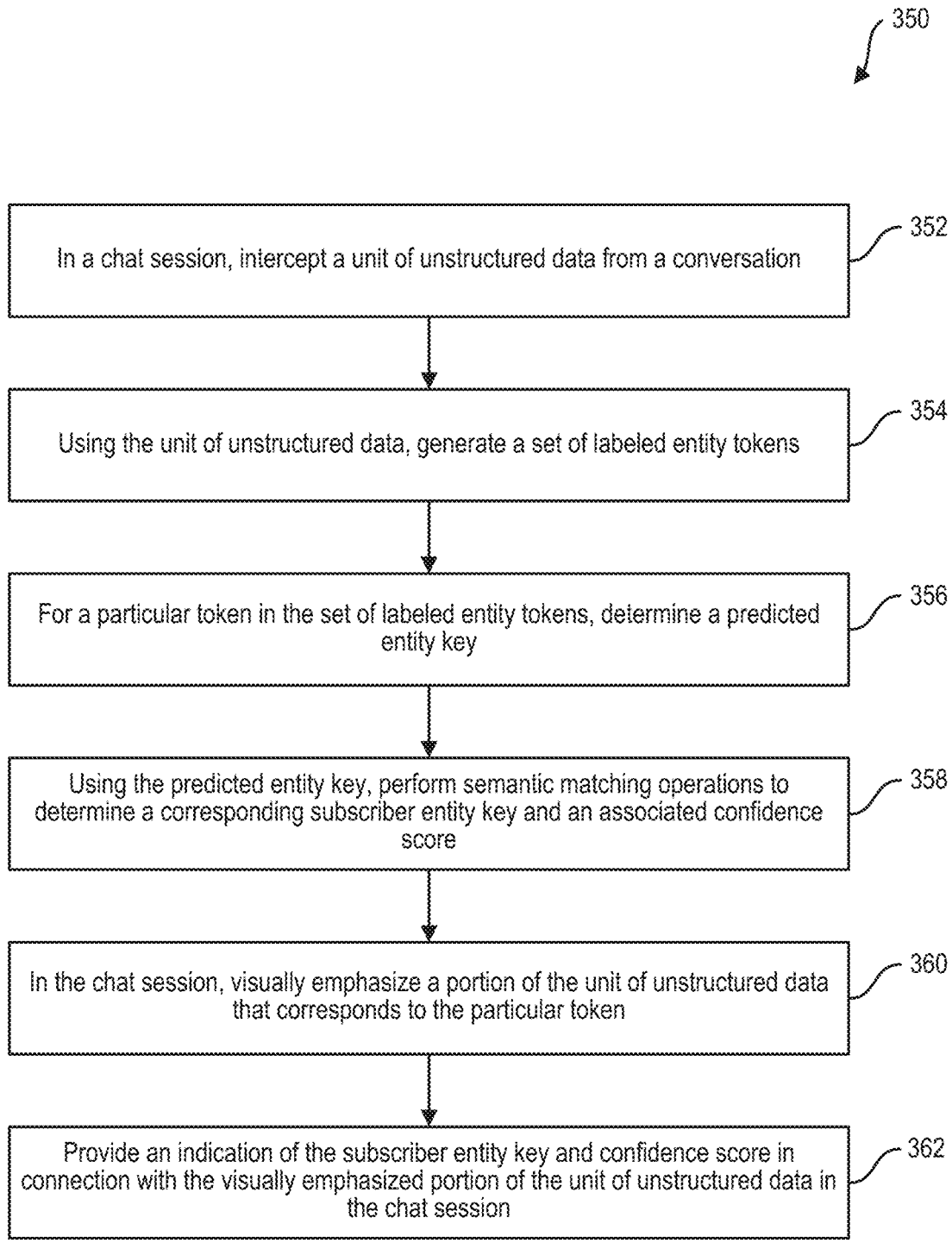
FIG. 3B is a flow diagram that illustrates an example method for using generic contextual NER techniques to contextualize items in chat sessions, in accordance with some implementations of the present technology.

FIG. 3B is a flow diagram that illustrates an example process 350 for using generic contextual NER techniques to contextualize items in chat sessions, in accordance with some implementations of the present technology. The process 350 can be performed by a system (e.g., generic contextual NER platform 100) configured to perform the operations described herein. In one example, the system includes at least one hardware processor and at least one non-transitory memory storing instructions, which, when executed by the at least one hardware processor, cause the system to perform the process 350. In another example, the system includes a non-transitory, computer-readable storage medium comprising instructions recorded thereon, which, when executed by at least one data processor, cause the system to perform the process 350. At 352, the platform can access a chat bot conversation in an active (unexpired, open, and so forth) chat session at a subscriber computing system. While the chat session is active, the platform can perform NER and entity resolution operations, including, at 354, generating a set of labeled entity tokens; at 356, determining or generating a predicted entity key; at 358, performing semantic matching operations to identify a subscriber entity key that corresponds to the predicted entity key; and, at 360, visually emphasizing the corresponding item in the chat session. For example, the item can be outlined, highlighted, set to a particular color, dynamically bound to a pop-up box, and so forth. At 362, the platform can provide an indication (e.g., via the chat session) of the automatically determined subscriber entity key and/or the associated confidence score. In various implementations, the system can perform or cause to be performed various additional actions, such as modifying chat session parameters (e.g., handing over a chat session to another agent or entity, tagging an agent or entity, invoking a bot, generating and displaying a graphic or a pop-up containing additional information).

Example Computing Environment

Figure 4:
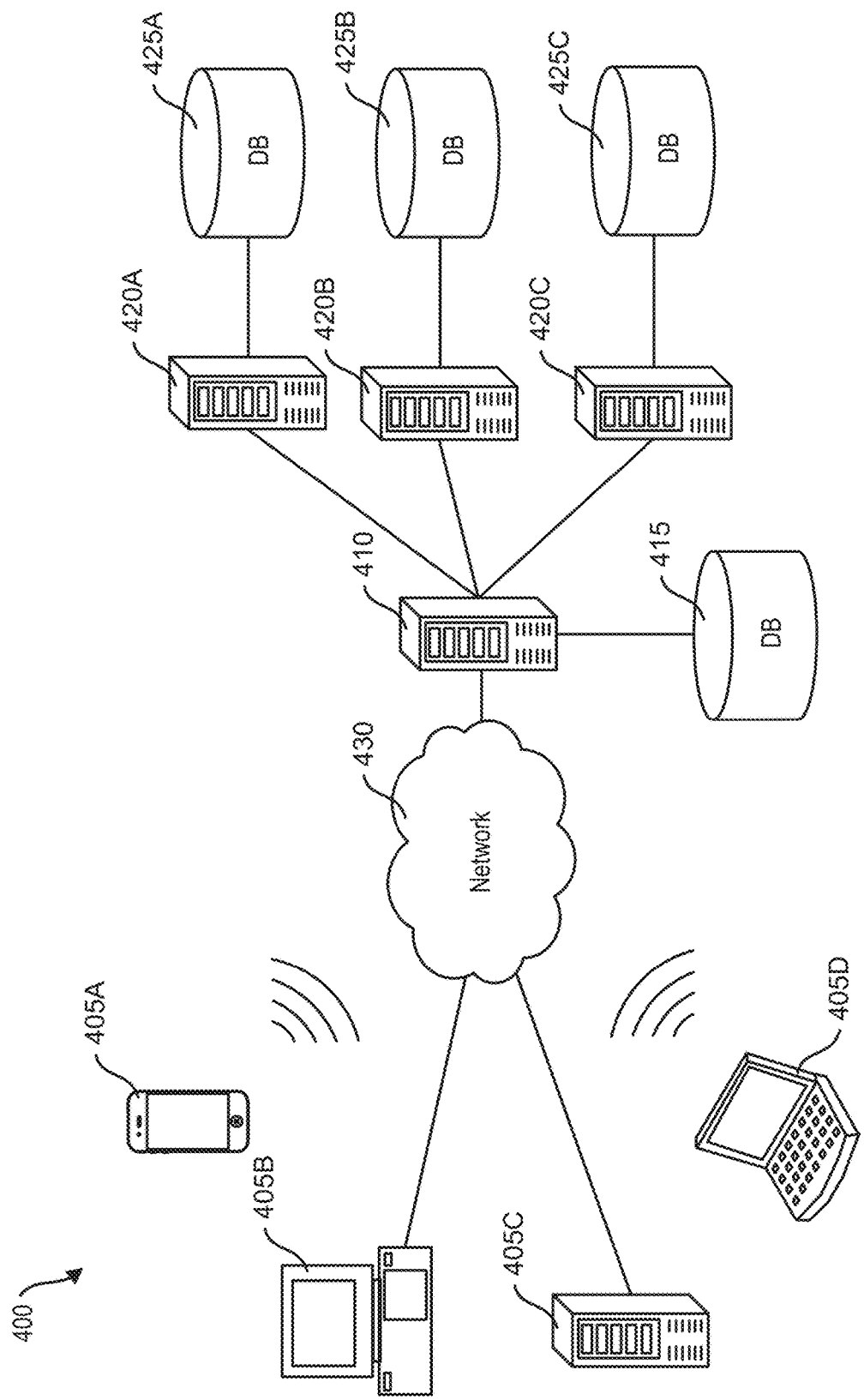
FIG. 4 is a system diagram illustrating an example of a computing environment in which the disclosed system operates in some implementations of the present technology.

FIG. 4 is a system diagram illustrating an example of a computing environment in which the disclosed system operates in some implementations. In some implementations, environment 400 includes one or more client computing devices 405A-D, examples of which can host the generic contextual NER platform 100 of FIG. 1. Client computing devices 405 operate in a networked environment using logical connections through network 430 to one or more remote computers, such as a server computing device.

In some implementations, server 410 is an edge server which receives client requests and coordinates fulfillment of those requests through other servers, such as servers 420A-C. In some implementations, server 410 can include a load balancer that distributes requests among a set of servers. In some implementations, server computing devices 410 and 420 comprise computing systems, such as the generic contextual NER platform 100 of FIG. 1. For example, a particular server 410 can include an ASIC configured to perform a particular AI operation (e.g., neural network processing, such as entity extraction, reverse question-and-answer, entity alignment). Although each server computing device 410 and 420 is displayed logically as a single server, server computing devices can each be a distributed computing environment encompassing multiple computing devices located at the same or at geographically disparate physical locations. In some implementations, each server 420 corresponds to a group of servers.

Client computing devices 405 (e.g., a subscriber computing system used by an agent to participate in a chat session or used to provide input data files) and server computing devices 410 and 420 can each act as a server or client to other server or client devices. In some implementations, servers (410, 420A-C) connect to a corresponding database (415, 425A-C). As discussed above, each server 420 can correspond to a group of servers, and each of these servers can share a database or can have its own database. Databases 415 and 425 warehouse (e.g., store) information such as training data, ontologies, entity data (e.g., entity, type), domain-specific data, configuration data, model data, weights, vectorized representations of data, graph representations of data, rules and/or logic for detecting similarities, chat session management data, and so forth. Though databases 415 and 425 are displayed logically as single units, databases 415 and 425 can each be a distributed computing environment encompassing multiple computing devices, can be located within their corresponding server, or can be located at the same or at geographically disparate physical locations.

Network 430 can be a local area network (LAN) or a wide area network (WAN), but can also be other wired or wireless networks. In some implementations, network 430 is the Internet or some other public or private network. Client computing devices 405 are connected to network 430 through a network interface, such as by wired or wireless communication. While the connections between server 410 and servers 420 are shown as separate connections, these connections can be any kind of local, wide area, wired, or wireless network, including network 430 or a separate public or private network.

Figure 5:
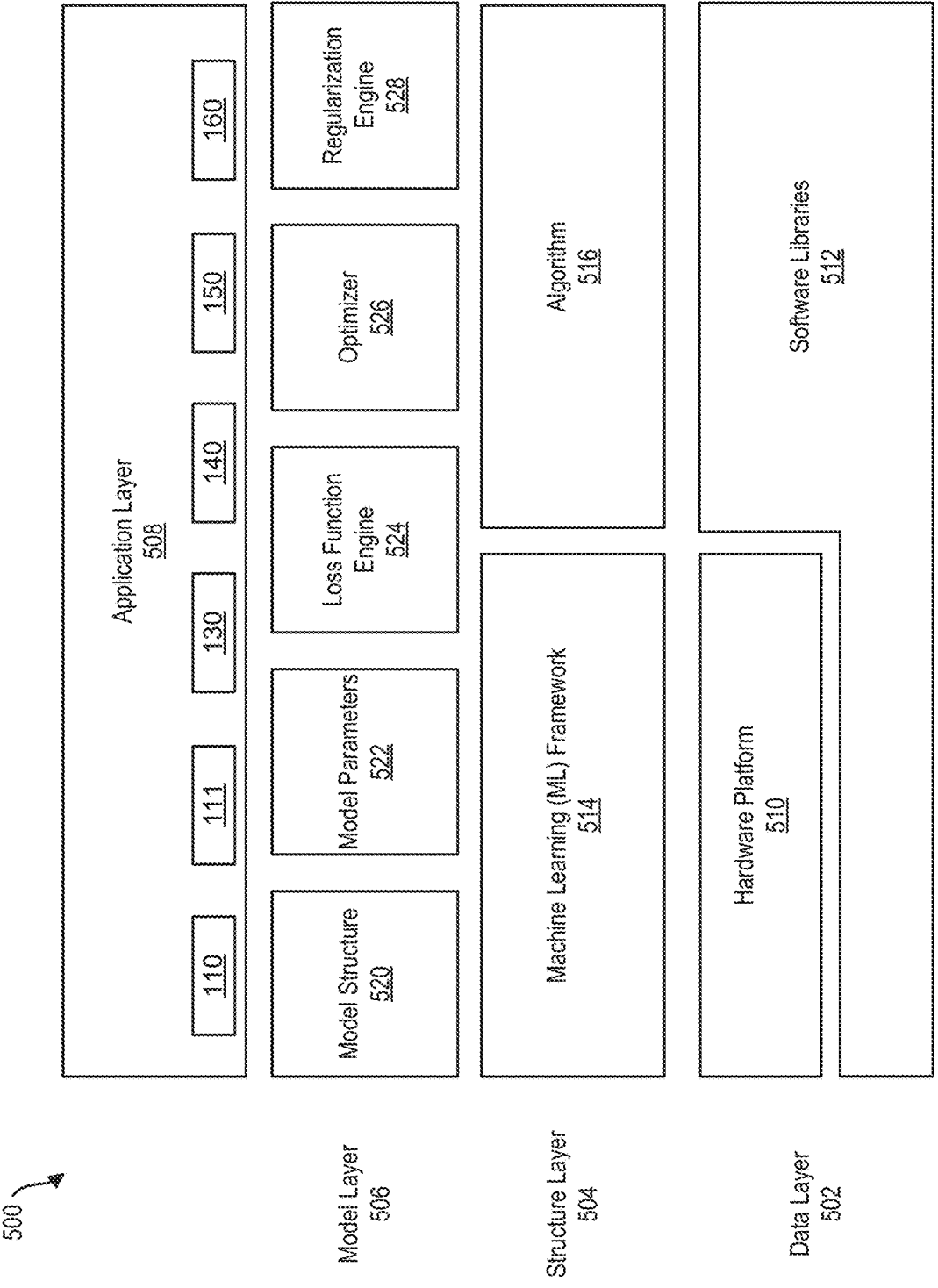
FIG. 5 illustrates a layered architecture of an artificial intelligence (AI) system that can implement the ML models of the generic contextual NER platform of FIG. 1, in accordance with some implementations of the present technology.

FIG. 5 illustrates a layered architecture of an artificial intelligence (AI) system 500 that can implement the ML models of the generic contextual NER platform 100 of FIG. 1, in accordance with some implementations of the present technology. For example, any of the context manager 110, chat manager 111, entity extractor 130, reverse question-and-answer generator 140, entity alignment engine 150, and/or output manager 160 can include or can cause execution of one or more components of the AI system 500.

As shown, the AI system 500 can include a set of layers, which conceptually organize elements within an example network topology for the AI system's architecture to implement a particular AI model. Generally, an AI model is a computer-executable program implemented by the AI system 500 that analyses data to make predictions. Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking, such as the resources described in relation to FIGS. 4 and 6. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of as suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy a particular AI model or models. The ML framework 514 can include an open-source library, an application programming interface (API), a gradient-boosting library, an ensemble method, and/or a deep learning toolkit that work with the layers of the AI system 500 to facilitate development of the AI model. For example, the ML framework 514 can distribute processes for application or training of the AI model across multiple resources in the hardware platform 510. The ML framework 514 can also include a set of components that have the functionality to implement and train a particular AI model and allow users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI system 500 include Hugging Face Transformers, Stanford CoreNLP, SPACY, TENSORFLOW, PYTORCH, SCIKIT-LEARN, KERAS, LightGBM, RANDOM FOREST, and AMAZON WEB SERVICES, OpenNLP, and GENSIM. In some implementations, more than one framework 514 can be utilized to train and/or invoke specific algorithms 516. For example, any of the context manager 110, chat manager 111, entity extractor 130, reverse question-and-answer generator 140, entity alignment engine 150, and/or output manager 160 can utilize a particular framework 514 to train and/or invoke a particular algorithm 516.

A particular algorithm 516 can be an organized set of computer-executable operations used to generate output data from a set of input data and can be described using pseudocode. The algorithm 516 can include complex code that allows the computing resources to learn from new input data and create new/modified outputs based on what was learned. In some implementations, the algorithm 516 can build the AI model through being trained while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning. In some implementations, different training techniques can be utilized to train different algorithms 516.

For example, using supervised learning, the algorithm 516 can be trained to learn patterns (e.g., map input data to output data) based on labeled training data. The training data may be labeled by an external user or operator. For instance, a user may collect a set of training data, such as by generating, importing, compiling, or entering entity data, ontology data, or domain-specific data. Furthermore, training data can include structured data (e.g., data units 120, 132, 142, 152, 162) generated by various engines of the generic contextual NER platform 100 described in relation to FIG. 1. In some implementations, the user may label the training data based on one or more classes and trains the AI model by inputting the training data to the algorithm 516. In various implementations, the structured data can include labels in the form of attribute identifiers, metadata, keys in key-value pairs, or any other suitable form. Examples of structured data and their corresponding labels include product information with category and brand labels, customer data with customer segment and purchase category labels, medical records with diagnosis and treatment outcome labels, customer service call transcripts with issue and resolution labels, financial transactions with transaction type and account type labels, sensor data with sensor status and alarm status labels, text data with sentiment and topic labels, image data with object and scene labels, audio data with music genre and speaker identity labels, time-series data with trend and anomaly labels, and graph data with node and edge labels.

The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data relate to the categories. Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format.

A few techniques can be used to facilitate model learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can include any of the context manager 110, chat manager 111, entity extractor 130, reverse question-and-answer generator 140, entity alignment engine 150, and/or output manager 160 of the generic contextual NER platform 102, or any other application or executable capable of performing or causing to be performed the operations described herein. In some implementations, the application layer 508 includes a user interface, such as a graphical user interface, voice user interface, or the like.

Example Computer System

Figure 6:
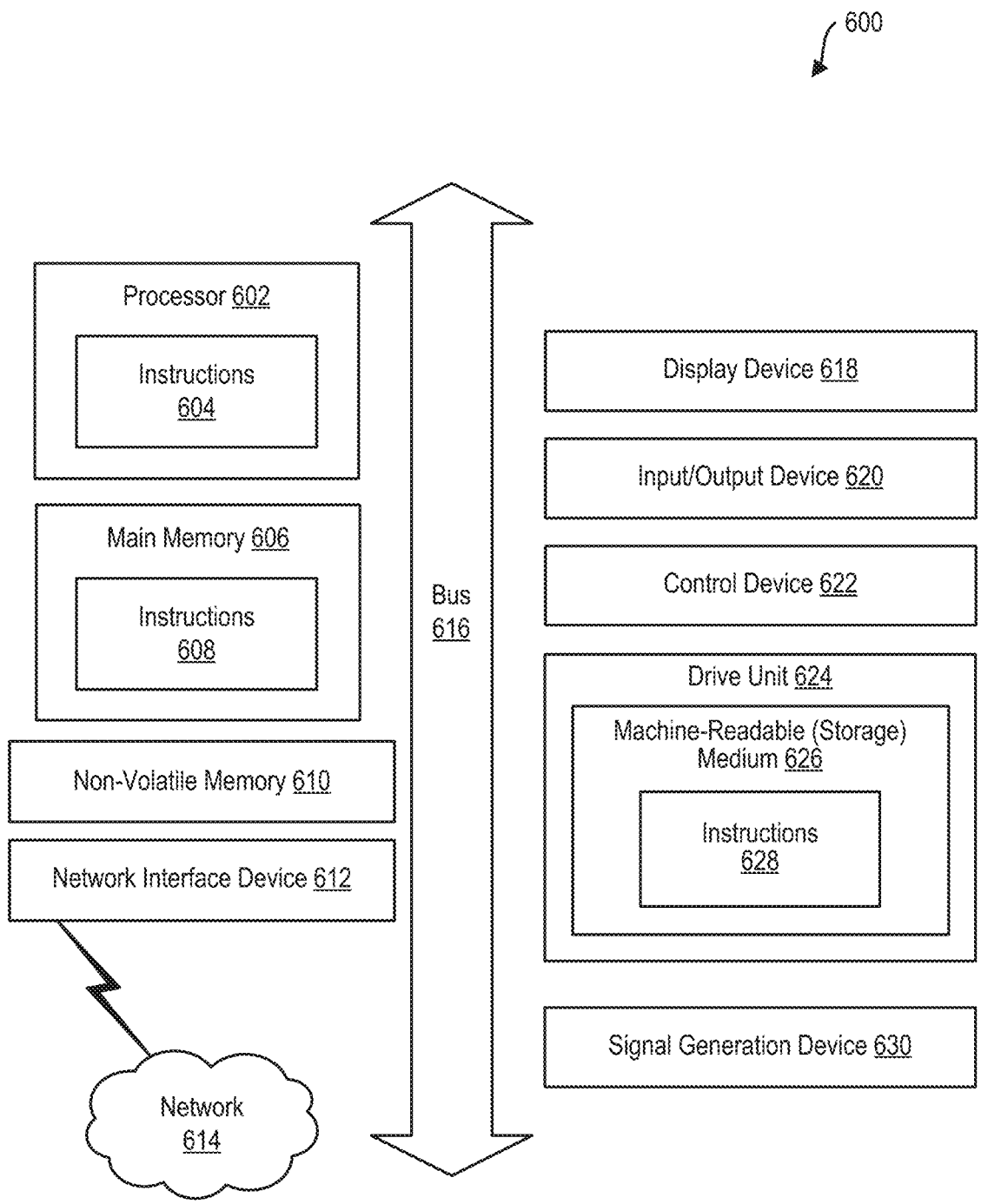
FIG. 6 is a block diagram that illustrates an example of a computer system in which at least some generic contextual NER platform operations described herein can be implemented in accordance with some aspects of the present technology.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Examples

Aspects of the present disclosure can be appreciated through non-limiting examples below.

In some aspects, the techniques described herein relate to a computer-implemented method for generic contextual named entity recognition (NER) using entity alignment, the method including: receiving, by a computing engine communicatively coupled to a subscriber computing system, unstructured data; applying, by the computing engine, a natural language processing technique to the unstructured data to generate a set of labeled entity tokens; for a particular labeled entity token in the set of labeled entity tokens, using a reverse question-and-answer model, generating a predicted entity key corresponding to the particular labeled entity token; and performing entity alignment operations, the entity alignment operations including: accessing a subscriber ontology provided by the subscriber computing system; and searching the subscriber ontology using the predicted entity key to determine a subscriber entity key, wherein determining the subscriber entity key includes calculating a similarity value between the predicted entity key and the subscriber entity key; and using the subscriber entity key, generating and transmitting to the subscriber computing system an electronic signal including two or more of: (i) the particular labeled entity token, (ii) the subscriber entity key, or (iii) the similarity value.

In some aspects, the techniques described herein relate to a computer-implemented method, the method including: generating a set of related items by extracting at least a first portion of the unstructured data and a second portion of the unstructured data, wherein the first portion of the unstructured data is contextually relevant to the second portion of the unstructured data; and applying, by the computing engine, the natural language processing technique to the set of related items to generate the set of labeled entity tokens.

In some aspects, the techniques described herein relate to a computer-implemented method, the method including: determining, by the computing engine, that the first portion of the unstructured data is contextually relevant to the second portion of the unstructured data by using the first portion of the unstructured data to generate a token and using the token to query a data source for a set of candidate items for the second portion of the unstructured data, wherein the second portion of the unstructured data is identified in response to detecting a user indication, via the subscriber computing system, of an item in the set of candidate items.

In some aspects, the techniques described herein relate to a computer-implemented method, the method including: applying, by the computing engine, the natural language processing technique to the unstructured data to generate a set of labeled entity tokens by executing one or more AI models trained to automatically determine a data type corresponding to a portion of the unstructured data, wherein the particular labeled entity token includes the portion of the unstructured data and a determined data type.

In some aspects, the techniques described herein relate to a computer-implemented method, the method including: generating the predicted entity key using the portion of the unstructured data and the determined data type as an input to the reverse question-and-answer model.

In some aspects, the techniques described herein relate to a computer-implemented method, the method including: in response to determining that the similarity value between the predicted entity key and the subscriber entity key is at or greater than a predetermined threshold, generating and causing a transmission, to the subscriber computing system, of the electronic signal.

In some aspects, the techniques described herein relate to a computer-implemented method, the method including: searching the subscriber ontology using one or more of a fuzzy matcher, a set of if-then statements, or a neural network trained to classify subscriber entity keys into categories.

In some aspects, the techniques described herein relate to a computer-implemented method for using generic contextual named entity recognition (NER) to contextualize items in chat sessions, the method including: accessing, by a computing engine communicatively coupled to a subscriber computing system, a chat session at a graphical user interface (GUI) of the subscriber computing system; and while the chat session is active, performing NER operations including: using at least a portion of a transcript of the chat session, generating a set of labeled entity tokens; for a particular labeled entity token in the set of labeled entity tokens, generating a predicted entity key corresponding to the particular labeled entity token; and performing semantic matching operations on the predicted entity key to determine a subscriber entity key and an associated confidence score; causing the GUI of the subscriber computing system to perform at least one of: (i) visually emphasizing an item in the transcript that corresponds to the particular labeled entity token, or (ii) displaying the subscriber entity key and the associated confidence score.

In some aspects, the techniques described herein relate to a computer-implemented method, the method including: generating a set of related items by extracting at least a first portion of the transcript and a second portion of the transcript, wherein the first portion is contextually relevant to the second portion; and applying, by the computing engine, a natural language processing technique to the set of related items to generate the set of labeled entity tokens.

In some aspects, the techniques described herein relate to a computer-implemented method, the method including: applying, by the computing engine, a natural language processing technique to the transcript of the chat session to generate the set of labeled entity tokens by executing one or more AI models trained to automatically determine a data type corresponding to a portion of the transcript of the chat session, wherein the particular labeled entity token includes the portion of the transcript of the chat session and a determined data type.

In some aspects, the techniques described herein relate to a computer-implemented method, the method including: generating the predicted entity key using the portion of the transcript and the determined data type as an input to a reverse question-and-answer model.

In some aspects, the techniques described herein relate to a computer-implemented method, the method including: in response to determining that the associated confidence score is at or greater than a predetermined threshold, performing at least one of: (i) visually emphasizing the item in the transcript that corresponds to the particular labeled entity token, or (ii) displaying the subscriber entity key and the associated confidence score.

In some aspects, the techniques described herein relate to a computer-implemented method, the method including: searching a subscriber ontology for the subscriber entity key using fuzzy matching or a set of if-then statements.

In some aspects, the techniques described herein relate to a computer-implemented method, the method including: determining the subscriber entity key by applying a neural network trained to classify subscriber entity keys into categories, wherein a particular category for the subscriber entity key corresponds to the predicted entity key.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A computer-implemented method for generic contextual named entity recognition (NER) using entity alignment, the method comprising:
   receiving, by a computing engine communicatively coupled to a subscriber computing system, unstructured data;
   applying, by the computing engine, a natural language processing technique to the unstructured data to generate a set of labeled entity tokens;
   for a particular labeled entity token in the set of labeled entity tokens,
       using a reverse question-and-answer model, generating a predicted entity key corresponding to the particular labeled entity token; and
       performing entity alignment operations, the entity alignment operations comprising:
           accessing a subscriber ontology provided by the subscriber computing system, wherein the subscriber ontology comprises a key-value pair including a subscriber entity key; and
           searching the subscriber ontology using the predicted entity key to determine the subscriber entity key, wherein determining the subscriber entity key comprises calculating a similarity value between the predicted entity key and the subscriber entity key; and
       using the subscriber entity key, generating and transmitting to the subscriber computing system, an electronic signal comprising two or more of: (i) the particular labeled entity token, (ii) the subscriber entity key, or (iii) the similarity value, wherein the electronic signal comprises computer-executable instructions to cause the subscriber computing system to perform an activity.

2. The computer-implemented method of claim 1, the method comprising:
generating a set of related items by extracting at least a first portion of the unstructured data and a second portion of the unstructured data, wherein the first portion of the unstructured data is contextually relevant to the second portion of the unstructured data; and
applying, by the computing engine, the natural language processing technique to the set of related items to generate the set of labeled entity tokens; and
determining, by the computing engine, that the first portion of the unstructured data is contextually relevant to the second portion of the unstructured data by using the first portion of the unstructured data to generate a token and using the token to query a data source for a set of candidate items for the second portion of the unstructured data,
wherein the second portion of the unstructured data is identified in response to detecting a user indication, via the subscriber computing system, of an item in the set of candidate items.

3. The computer-implemented method of claim 1, wherein the similarity value is computed by determining Levenshtein distance, determining Jaro-Winkler distance, or applying a Longest Common Subsequence technique to compare the predicted entity key and the subscriber entity key.

4. The computer-implemented method of claim 1, the method comprising:
applying, by the computing engine, the natural language processing technique to the unstructured data to generate a set of labeled entity tokens by executing one or more AI models trained to automatically determine a data type corresponding to a portion of the unstructured data,
wherein the particular labeled entity token comprises the portion of the unstructured data and a determined data type.

5. The computer-implemented method of claim 4, the method comprising:
generating the predicted entity key using the portion of the unstructured data and the determined data type as an input to the reverse question-and-answer model.

6. The computer-implemented method of claim 1, the method comprising:
in response to determining that the similarity value between the predicted entity key and the subscriber entity key is at or greater than a predetermined threshold, generating and causing a transmission, to the subscriber computing system, of the electronic signal.

7. The computer-implemented method of claim 1, the method comprising:
searching the subscriber ontology using one or more of a fuzzy matcher, a set of if-then statements, or a neural network trained to classify subscriber entity keys into categories.

8. A computer-implemented method for using generic contextual named entity recognition (NER) to contextualize items in chat sessions, the method comprising:
accessing, by a computing engine communicatively coupled to a subscriber computing system, a chat session at a graphical user interface (GUI) of the subscriber computing system; and
while the chat session is active, performing NER operations comprising:
using at least a portion of a transcript of the chat session, generating a set of labeled entity tokens;
for a particular labeled entity token in the set of labeled entity tokens,
generating a predicted entity key corresponding to the particular labeled entity token; and
performing semantic matching operations on the predicted entity key to determine a subscriber entity key and an associated confidence score;
causing the GUI of the subscriber computing system to perform at least one of: (i) visually emphasizing an item in the transcript that corresponds to the particular labeled entity token, or (ii) displaying the subscriber entity key and the associated confidence score.

9. The computer-implemented method of claim 8, the method comprising:
generating a set of related items by extracting at least a first portion of the transcript and a second portion of the transcript, wherein the first portion is contextually relevant to the second portion; and
applying, by the computing engine, a natural language processing technique to the set of related items to generate the set of labeled entity tokens.

10. The computer-implemented method of claim 8, the method comprising:
applying, by the computing engine, a natural language processing technique to the transcript of the chat session to generate the set of labeled entity tokens by executing one or more AI models trained to automatically determine a data type corresponding to a portion of the transcript of the chat session,
wherein the particular labeled entity token comprises the portion of the transcript of the chat session and a determined data type.

11. The computer-implemented method of claim 10, the method comprising:
generating the predicted entity key using the portion of the transcript and the determined data type as an input to a reverse question-and-answer model.

12. The computer-implemented method of claim 8, the method comprising:
in response to determining that the associated confidence score is at or greater than a predetermined threshold, performing at least one of: (i) visually emphasizing the item in the transcript that corresponds to the particular labeled entity token, or (ii) displaying the subscriber entity key and the associated confidence score.

13. The computer-implemented method of claim 8, the method comprising:
searching a subscriber ontology for the subscriber entity key using fuzzy matching or a set of if-then statements.

14. The computer-implemented method of claim 8, the method comprising:
determining the subscriber entity key by applying a neural network trained to classify subscriber entity keys into categories, wherein a particular category for the subscriber entity key corresponds to the predicted entity key.

15. One or more non-transitory, computer-readable media having instructions stored thereon, the instructions, when executed by at least one processor, configured to cause a computing engine to perform a computer-implemented method for using generic contextual named entity recognition (NER) to contextualize items in chat sessions, the method comprising:
  accessing, by the computing engine communicatively coupled to a subscriber computing system, a chat session at a graphical user interface (GUI) of the subscriber computing system; and
  while the chat session is active, performing NER operations comprising:
    using at least a portion of a transcript of the chat session, generating a set of labeled entity tokens;
    for a particular labeled entity token in the set of labeled entity tokens,
      generating a predicted entity key corresponding to the particular labeled entity token; and
      performing semantic matching operations on the predicted entity key to determine a subscriber entity key and an associated confidence score;
    causing the GUI of the subscriber computing system to perform at least one of: (i) visually emphasizing an item in the transcript that corresponds to the particular labeled entity token, or (ii) displaying the subscriber entity key and the associated confidence score.

16. The media of claim 15, the instructions further comprising:
  generating a set of related items by extracting at least a first portion of the transcript and a second portion of the transcript, wherein the first portion is contextually relevant to the second portion; and
  applying, by the computing engine, a natural language processing technique to the set of related items to generate the set of labeled entity tokens.

17. The media of claim 15, the instructions further comprising:
  applying, by the computing engine, a natural language processing technique to the transcript of the chat session to generate the set of labeled entity tokens by executing one or more AI models trained to automatically determine a data type corresponding to a portion of the transcript of the chat session,
    wherein the particular labeled entity token comprises the portion of the transcript of the chat session and a determined data type.

18. The media of claim 17, the method comprising:
generating the predicted entity key using the portion of the transcript and the determined data type as an input to a reverse question-and-answer model.

19. The media of claim 15, the method comprising:
in response to determining that the associated confidence score is at or greater than a predetermined threshold, performing at least one of: (i) visually emphasizing the item in the transcript that corresponds to the particular labeled entity token, or (ii) displaying the subscriber entity key and the associated confidence score.

20. The media of claim 15, the method comprising:
searching a subscriber ontology for the subscriber entity key using fuzzy matching or a set of if-then statements.

* * * * *